Nov. 29, 1966  D. HEYER  3,287,988
VARIABLE SPEED PULLEY-BELT DRIVE
Filed May 11, 1964  8 Sheets-Sheet 2

INVENTOR.
DON HEYER
BY
Paul A. Weilein
ATTORNEY

Nov. 29, 1966  D. HEYER  3,287,988
VARIABLE SPEED PULLEY-BELT DRIVE
Filed May 11, 1964  8 Sheets-Sheet 4

INVENTOR.
DON HEYER
BY Paul A. Weilein
ATTORNEY

INVENTOR.
DON HEYER
BY
Paul A. Weilein
ATTORNEY

INVENTOR.
DON HEYER
BY
Paul A. Weilein
ATTORNEY

3,287,988
VARIABLE SPEED PULLEY-BELT DRIVE
Don Heyer, 1019 N. Raymond Ave., Fullerton, Calif.
Filed May 11, 1964, Ser. No. 366,350
20 Claims. (Cl. 74—230.17)

The present invention relates to a variable speed pulley-belt drive, and more particularly to improvements in the class of variable speed transmission devices wherein a housing contains a drive pulley and a driven pulley, each pulley having one disc axially adjustable relative to the other to effect engagement with a belt extending between the pulleys at different effective belt engaging pulley diameters whereby the speed of the output or driven pulley shaft is varied.

In the conventional variable drive transmissions of the type here involved a number of problems are presented respecting the maintenance of effective torque transmitting coengagement between the belt and the pulleys; the ease of adjustment of the ratio, namely the relative axial adjustment of the respective pulley sections of the input and output pulleys, particularly upon load change or reversal of direction of drive; flexibility of installation and application; simplicity of manufacture and service, and more particularly the changing of belts.

Accordingly, among the objects of the present invention is the provision of a variable speed-pulley belt drive device which is comparatively simple to manufacture and maintain and which is flexible in order to facilitate a wide range of variation in the assembly and disposition of the mechanism as may be required for various applications.

It is another object of the invention to provide improved mechanism for varying the ratio of the drive. In particular this objective contemplates the provision of means whereby the adjustable pulley sections are simultaneously moved upon their respective shafts, in combination with means to maintain pressure on the adjustable pulley sections tending to urge the same towards the opposed axially fixed pulley section, whereby to maintain the belt under proper compression notwithstanding substantial variation in load on the device.

Another object is to provide a variable pulley-belt drive device, wherein the parts are so standardized as to enable the same assembly to serve in a number of different ways, for example either in what is typically referred to as a Z fashion or in a C fashion, the former being a fashion in which the output shaft is at the opposite side of the housing and in laterally spaced relation to the motor or input shaft and the latter fashion being one in which the output shaft extends from the housing at the same side as the motor or input shaft in laterally spaced relation to the motor axis. It is an aspect of the present invention that the drive and driven pulley assemblies be essentially identical in structure and therefore interchangeable with one another.

Still another object of the invention is to provide novel pulley and pulley adjuster mechanism which eliminates the use of keys or splines, as is customary in the prior devices, as the means for transmitting torque between the pulley supporting shaft and the axially adjustable pulley section. In this connection, the invention contemplates the provision of means slidably supporting the adjustable pulley section on the pulley shaft without restraining relative rotation of the pulley section and the shaft so that there is no resistance to axial movement of the pulley section along the shaft even though the pulley section be under torque load. In a more specific sense, self-energizing means including a member rotatable with the shaft and a member rotatable relative to the shaft, which latter member may be an intergral portion of the shiftable pulley section, are employed to force the shiftable pulley section towards the relatively stationary pulley section responsive to any tendency of the shiftable pulley section to lag behind or overrun the shaft, as the case may be, in the respective input and output pulley assemblies.

A further object is to provide a self-energizing torque transmitting device in an adjustable drive pulley in accordance with the next preceding objective, wherein the mechanism includes a friction drive connection between one of the torque responsive members and the pulley, whereby to cushion the torque reaction upon load change or torque reversal.

Still another object of the invention is to provide an assembly which is flexible and adaptable to installation in a variety of manners as may be required for different applications, while at the same time simplifiying the manufacture of the assembly. This objective is accomplished by the provision of a case or housing which is divided along a central plane and is comprised of a pair of identical housing half parts which may be conveniently die cast, turned end for end and assembled with similar pulley shaft bearing supports and end plates or with a motor mount or with shaft supports and end plates adapted to form supporting legs for the assembly, it being possible to adjust the relative angular disposition of the leg bearing end plates and the housing through a wide range of angular positions. Furthermore, this objective contemplates the provision of adjuster mechanism for simultaneously adjusting the ratio of the pulley-belt drive, such adjuster mechanism including a shaft spanning the housing and having at one of its ends co-engagement with operating means which may be manually or otherwise operated to effect pulley adjustment, such operating means being adapted so as to be connected to either end of the adjuster shaft and being operable by rotation in the same direction, that is, for example, clockwise rotation of an operator member to effect pulley adjustment in the same sense. In this connection, the operator means is provided with first and second gears, one engageable with a main adjuster gear, and the second engageable with the first gear and the rotary operating member being selectively interengageable with either of the first or second gears. As a further feature of the invention and within the purview of this objective the operating means may conveniently be provided with indicator means for visually or otherwise indicating the ratio at which the mechanism is set, and as a novel feature of the invention the above noted main adjuster gear has on its face a relatively angularly adjustable indicator dial, which may be adjusted and fixed in selected adjusted positions in a very simple manner.

Yet another object of the invention is to provide an assemby which facilitates the changing of belts without requiring disassembly of the drive device. In this connection, the housing is provided with an opening affording access to the pulleys in a lateral direction, and the pulleys include a shaft construction which enables telescoping of a shaft section relative to another to provide an opening transversely of the shaft assembly, between the pulley sections through which the belt may pass.

Other objects and advantages of the invention may be hereinafter discribed or will become apparent to those skilled in the art and the novel features of the invention will be defined in the appended claims.

In the accompanying drawings:

FIG. 19 is a view corresponding to FIG. 8, showing a modified adjustable pulley assembly;

Like reference characters in the several views of the drawings and in the following description designate corresponding parts.

Figure 1:
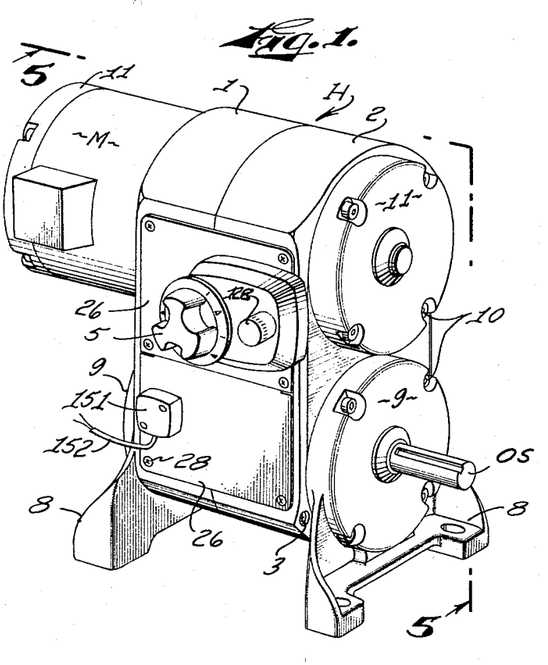
FIG. 1 is a view in perspective showing a variable pulley-belt drive assembly made in accordance with the invention.

Referring to FIG. 1, the present invention is shown as being embodied in an assemblage comprising a housing H formed of a pair of half parts 1 and 2 secured together by through bolts 3 and having mounted on one side thereof a motor M which will transmit power through a variable pulley belt drive, to be hereinafter described, to an output shaft which in the illustrated embodiment is designated OS and extends from the housing H through the opposite side thereof from the motor M and in laterally spaced relation to the motor axis so that the assembly may be characterized as a "Z" drive. The drive ratio between the motor M and the output shaft OS may be varied by effecting adjustment through adjuster means operable by a control knob 5, and an indication of the selected ratio may be viewed visually through an eye piece or may be transmitted as an electrical signal by means of a potentiometer.

Figure 2:
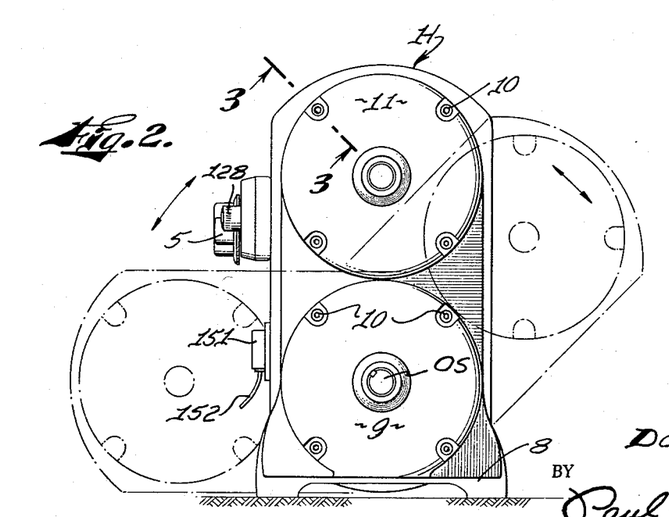
FIG. 2 is a view in end elevation showing the housing in an upright position in full lines and in two selected positions of angular adjustment within the range of its adjustability, in broken lines.
Figure 3:
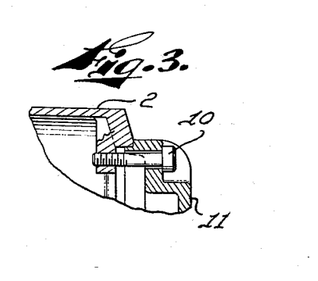
FIG. 3 is a fragmentary sectional view on an enlarged scale as taken on the line 3—3 of FIG. 2.

The housing H may be supported upon legs 8 formed as a part of housing closure plates 9 which may be suitably secured as by fasteners 10 in selected orientations relative to the housing H so that the latter may assume a wide variety of positions, two of which are shown by way of example in FIG. 2 in broken lines. It will be appreciated that a wider range of selected positions is available by transposition of the just mentioned closure plates 9 with closure plates 11 which are similar to the plates 9 with the exception that the plates 11 are not provided with legs as are the plates 9.

Figure 4:
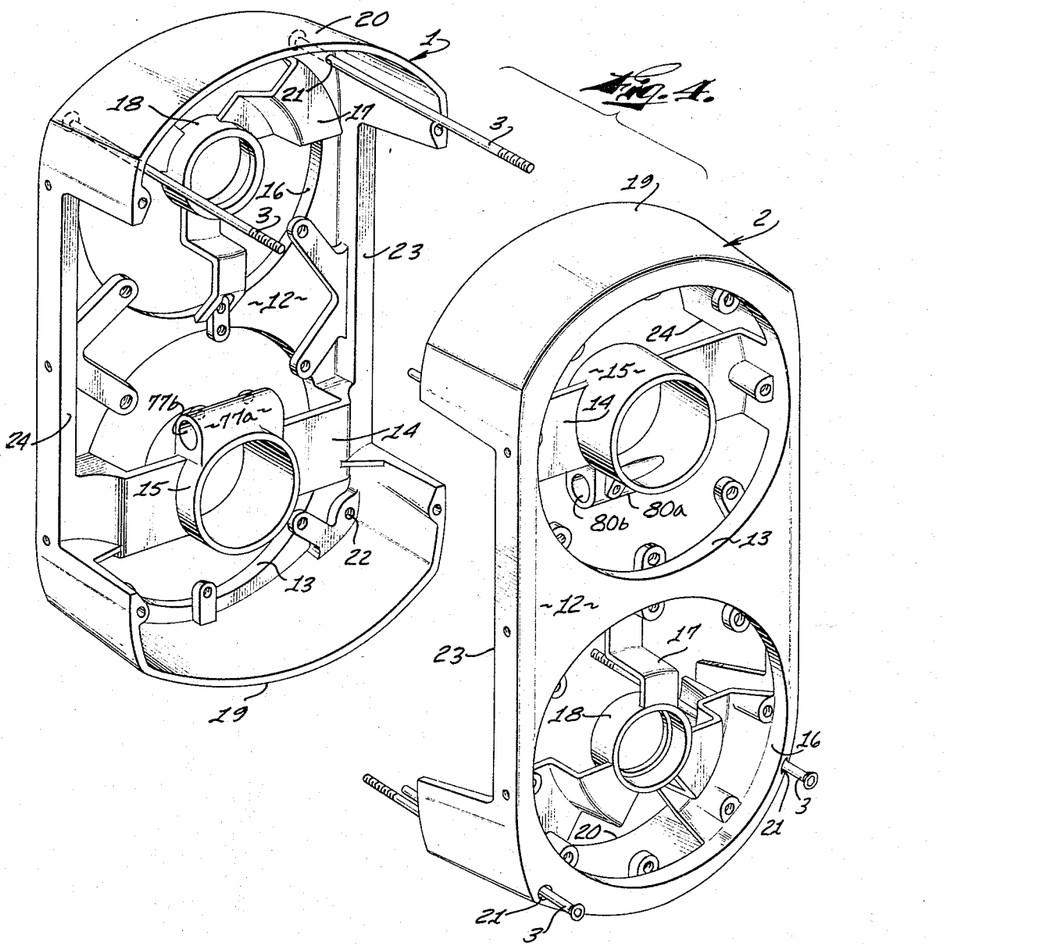
FIG. 4 is an exploded detail view showing in perspective the housing half parts and their securing means.

Referring to FIG. 4, it will be particularly noted that the housing parts 1 and 2 are identical components turned 180° relative to one another and each half part comprises a side wall 12 having an opening 13 provided with a spider 14 having a hub 15 adapted to support an adjustable pulley mechanism to be hereinafter more particularly described. Each of the side walls 12 also has an opening 16 in which is a spider 17 having a hub 18 adapted to support a motor shaft or the output shaft OS as will appear hereinafter.

Arched end walls 19 and 20 of the body parts are adapted to abut medially of the assembled housing and it will be observed that the fasteners or through bolts 3 extend through openings 21 adjacent the end flange 20 and into threaded openings 22 adjacent the end flange 19. Each of the parts also has lateral openings 23 and 24 between the end walls 19 and 20, which upon assembly of the parts together provide an access opening at the respective opposite sides of the housing. These access openings are closable by closure plates 25 and 26 adapted to be secured in place by fasteners 27 and 28, respectively, and inasmuch as the access openings open laterally with respect to the axes of the drive and driven pulley assemblies hereinafter to be described, service and maintenance of the assembly is facilitated and in addition certain advantages accrue as regards adjustment of the drive ratio.

Figure 5:
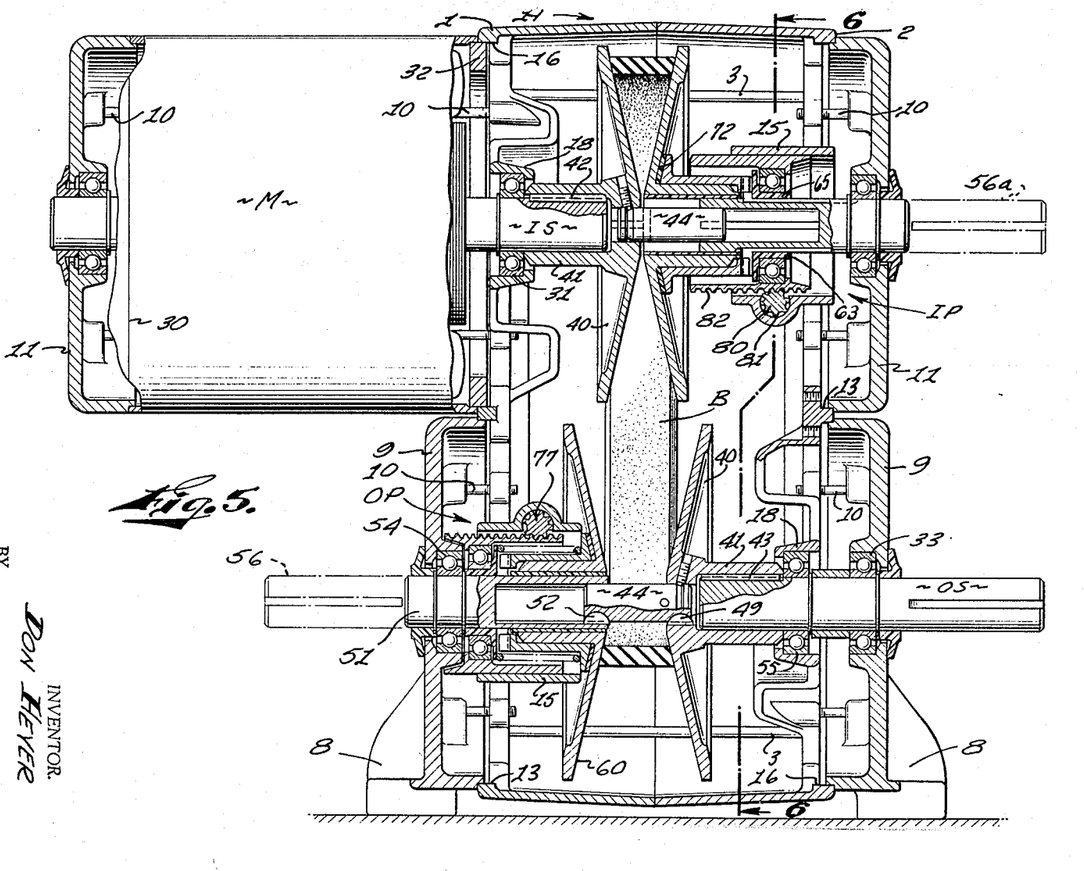
FIG. 5 is an enlarged view in section as taken on line 5—5 of FIG. 1.

Referring now to FIG. 5, it will be noted that the variable pulley belt drive contained within the housing comprises a pair of like pulley assemblies respectively designated IP and OP, the pulley assembly IP being connected to the motor or input shaft IS and the pulley assembly OP being connected to the driven or output shaft OS.

The motor M includes a housing 30 adapted to be secured to the housing section 1 in axial alignment with the opening 16 and with the motor shaft IS centralized in the spider hub 18 by means of a bearing 31. In order to facilitate mounting of the motor housing, an adapter ring 32 is provided which engages within the just mentioned opening 16, and the motor housing 30 is adapted to be secured to the housing part 1 by fasteners such as the fasteners 10 which secure the closure plates 9 and 11 to the housing.

The output shaft OS in the illustrative embodiment as shown in full lines is journalled in a bearing 33 in the closure plate 9 at the opposite side of the housing H from the motor M and in laterally spaced relation to the motor shaft axis. The pulley assemblies IP and OP each are mountable on one of the shafts IS and OS and each of these pulley assemblies, as is more particularly seen in FIGS. 5 and 8, includes an axially fixed pulley section 40 having an axially extended hub 41, the hub of the axially fixed pulley section of the input pulley being connected as by a key 42 to the input shaft IS, and the hub 41 of the output pulley section 40 being connected as by key 43 to the output shaft OS.

Figures 7, 8, 13:
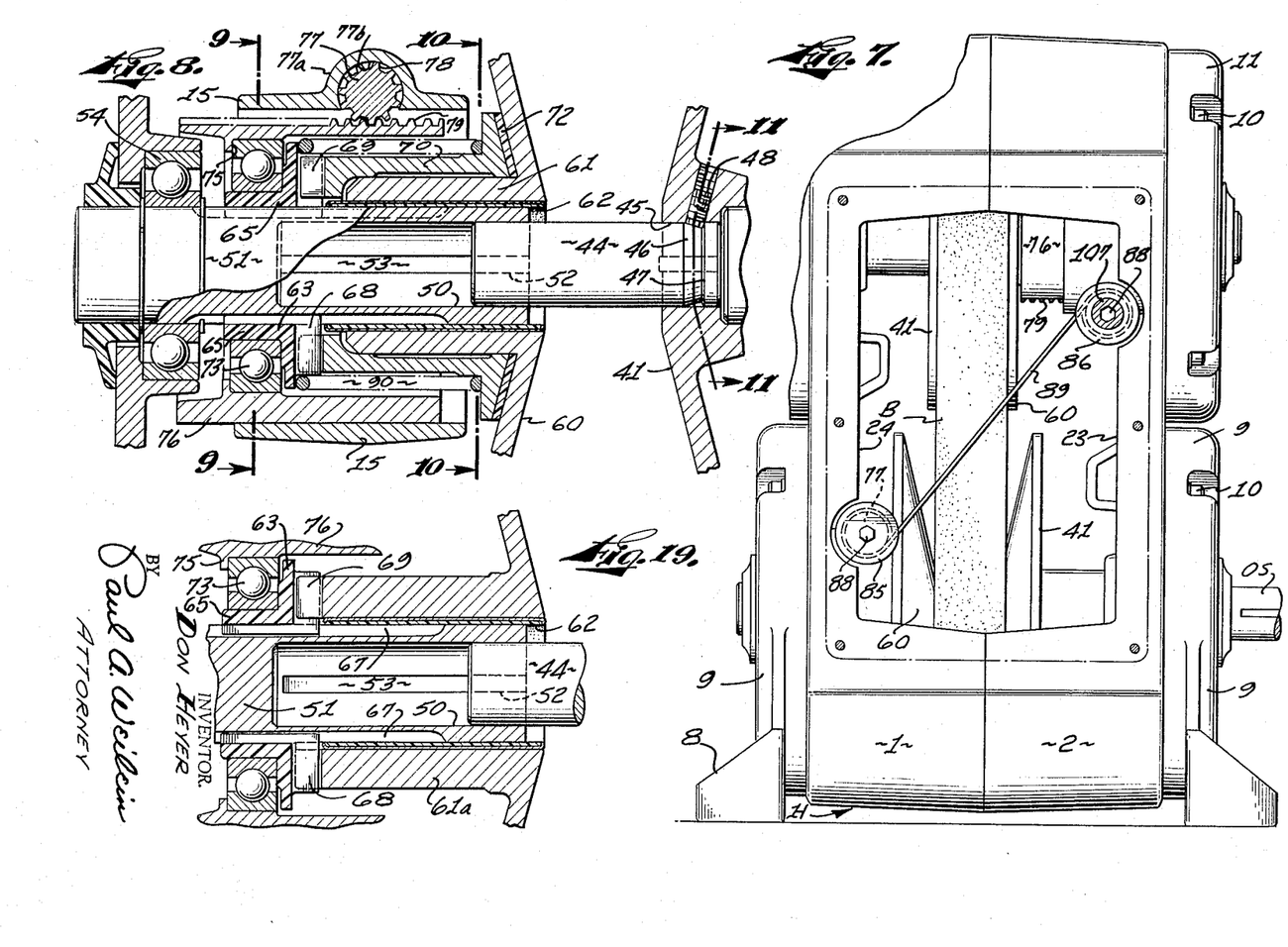
FIG. 7 is a view partly in elevation and partly in section as taken on line 7—7 of FIG. 6.
FIG. 8 is an enlarged detail view in section illustrating the driven pulley assembly.
FIG. 13 is a detail view partly in section and partly in elevation showing the torque responsive camming means of the pulley assemblies.
Figure 9:
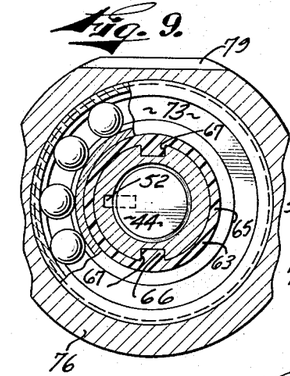
FIG. 9 is a transverse sectional view as taken on the line 9—9 of FIG. 8.
Figure 10:
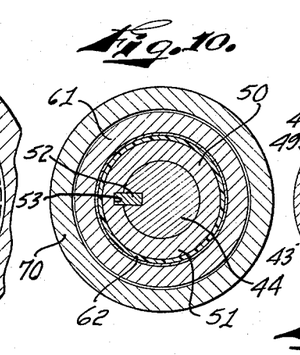
FIG. 10 is a transverse sectional view as taken on the line 10—10 of FIG. 8.
Figures 11, 13:
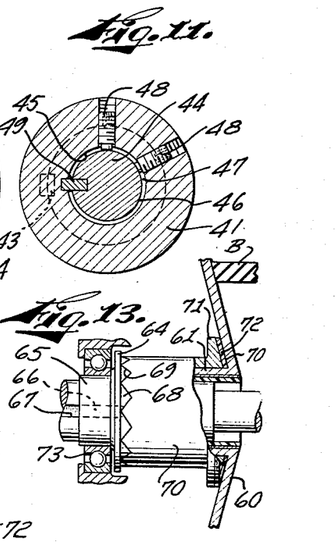
FIG. 11 is a transverse sectional view as taken on the line 11—11 of FIG. 8.

Each of the pulley assemblies includes an inner central shaft section 44 and means are provided for releasably connecting an end of the central shaft 44 to its pulley hub 41. In the illustrative embodiment, the hub 41 is provided with a central bore 45 into which an end of the shaft 44 projects, the latter being provided with an annular groove 46 presenting an abutment face 47 engageable by a suitable number of removable abutments 48, preferably in the form of set screws threaded in the pulley hub 41.

To effect torque transmission between the hub 41 and the shaft 44 of the respective pulley assemblies, a woodruff key 49 (see FIGS. 5 and 12) engages the end of shaft 44 and the hub. At its other end the shaft 44 extends into the hollow end 50 of a shaft 51, and a torque connection is effected by means of a woodruff key 52 engaging in this end of the shaft 44 and within the shaft 51 in a longitudinally extended keyway 53 which enables, for a purpose to be hereinafter described, telescopic movement of the shaft 44 into the shaft 51.

The shaft 51 of the output pulley assembly at its outer extremity extends through one of the closure plates 9 while input pulley shaft 57 extends through the closure plate 11 and these shafts are journalled in bearing 54 in the respective plates 9 and 11 so that it is now apparent that the shaft assemblage comprising shafts 51, 44, and output shaft OS are supported in coaxial alignment between the bearings 33 and 54 carried by the closure plates 9, while the input shaft assemblage 51, 44 is supported in the spider bearing 31 and the bearing 54 in plate 11. In addition, a further spider bearing 55 may be provided about the output shaft OS within the hub 18 of the body part 2.

If desired the output shaft may constitute, as shown in broken lines in FIG. 5, an extension 56 of the shaft 51 in which case the drive would be characterized as a "C" drive inasmuch as the output shaft 56 would be at the same side of the housing H as the motor M and in laterally spaced relation to the motor shaft axis. Furthermore, an output shaft 56a shown in broken lines in FIG. 5 may be directly driven by the input pulley shaft 51.

An axially adjustable pulley section 60 is slidably disposed upon the inner end of shaft 51 in each of the assemblies for movement toward and away from the pulley section 40. In order to facilitate such movement, the pulley section 60 has a hub 61 extending along the shaft 51 and engaged with an intermediate bushing or sleeve 62 which is preferably composed of nylon or other suitable self-lubricating material.

Figure 14:
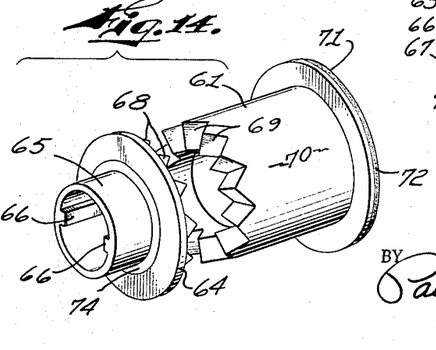
FIG. 14 is a detail view in perspective illustrating the cam elements of FIG. 13.

In the embodiment now being described, torque transmission between the pulley section 60 and the shaft 51 is by means of a self-energizing structure of camming means which, as shown in detail in FIGS. 13 and 14 and in assembly in FIGS. 5 and 7, comprises a thrust bearing support generally denoted at 63 and having a radial flange 64 projecting from a central hollow hub 65. This hub has internally thereof elongated keys 66 which slidably engage in keyways 67 formed in the outer periphery of the shaft 51 so as to rotate with the shaft. On its inner face the flange 64 is provided with camming means in the form of a plurality of triangular cam lobes 68 which cooperate with cam means on the pulley hub 61, the latter cam means being in the form of a plurality of triangular lobes 69 interfitting with the lobes 68 and formed at the end of a clutch sleeve 70 which is disposed about the pulley hub 61 for relative rotation.

At its inner extremity the clutch sleeve 70 of this embodiment has a conical flange 71 preferably provided with friction facing material 72 engageable with the opposing face of the pulley section 60, whereby rotation of the pulley section 60 will be transmitted through the friction facing material 72 to the clutch sleeve 70 and thence through interfitting cam lobes 69 and 68 to the hub 65 of bearing support 63 and by the keys 66 therein to the shaft 51, the latter being keyed to the pulley section 40 as previously described.

A thrust bearing 73 is disposed upon the bearing support hub 65 in engagement with a shoulder 74 on the latter and engaged by an internal flange 75 formed internally of a hollow thrust collar 76 which surrounds the bearing 73 and extends axially toward the pulley section 60. Movement of the thrust collar 76 in one direction will cause movement of the friction facing 72 into engagement with the pulley section 60 and consequent movement of the pulley section 60 toward the opposing pulley section 40; whereas movement of the thrust collar 76 in the opposite direction will enable movement of the pulley section 60 away from the pulley section 40.

Figures 6, 17, 17A:
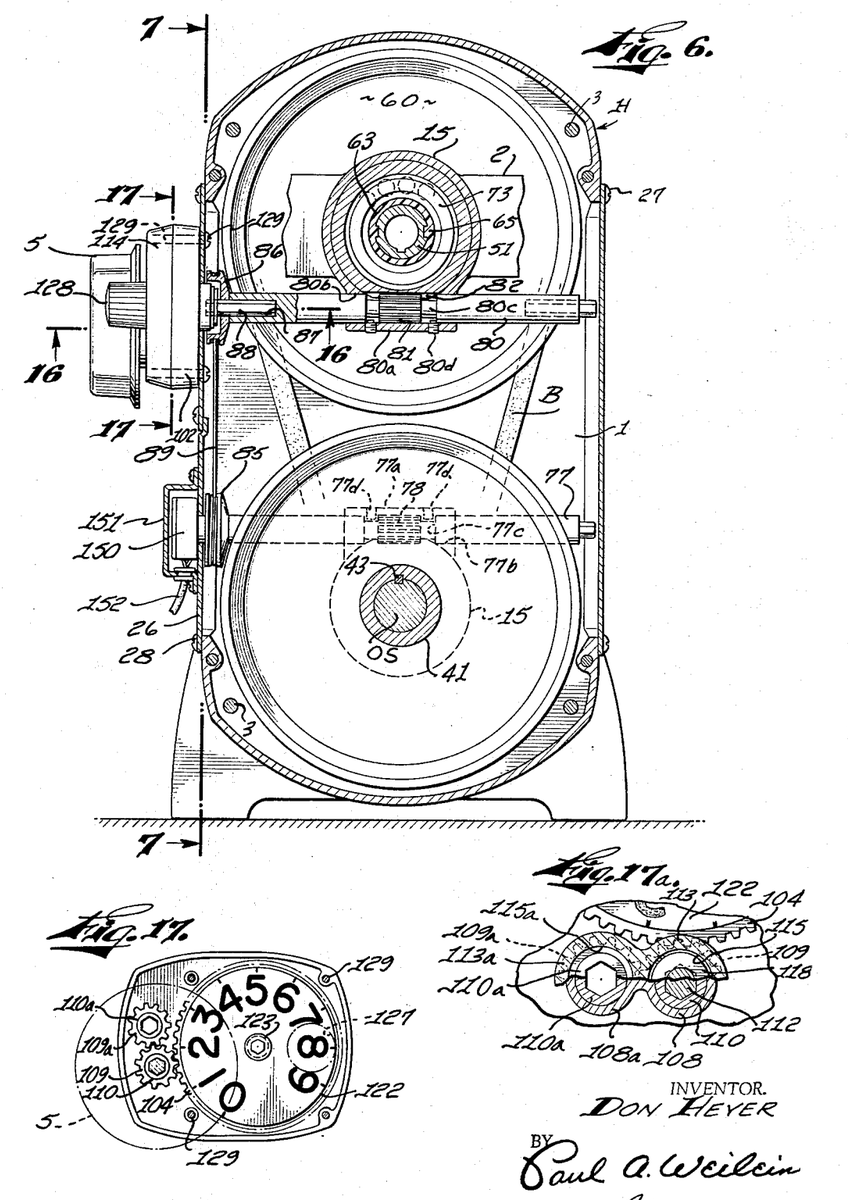
FIG. 6 is a view in transverse section as taken on line 6—6 of FIG. 5.
FIG. 17 is a view in vertical section as taken on line 17—17 of FIG. 6.
FIG. 17a is a view in section as taken on the line 17a—17a of FIG. 16 showing the compound bushing arrangement for the optional support of the adjuster knob and for the support of the knob operated pinions.

Such movement of the pulley 60 is effected by means of an adjuster shaft 77 having a pinion gear section 78 engageable with rack teeth 79 on the thrust collar 76 of the output pulley assembly OP; while in the case of the input pulley assembly IP such movement of the thrust collar 76 is effected by an adjuster shaft 80 having a pinion section 81 engageable with rack teeth 82 on the input pulley thrust collar 76. As best seen in FIGS. 4 and 6, the respective adjuster shafts 77 and 80 are adapted to be mounted in a bearing projection 77a formed on the spider hub 15 of housing part 1 and having an opening 77b therethrough and in a similar bearing projection 80a formed on the spider hub 15 of housing section 2 and having a shaft opening 80b therethrough. The shaft openings 77b and 80b intersect with the bore of the respective hubs 15 so that the pinions 78 and 81 are engageable with the racks 79 and 82 within the bores of hubs 15. In order to retain the shafts within the shaft openings 77b and 80b, each of them is grooved adjacent the respective pinions 78 and 81 as at 77c and 80c and the bearing projections support set screws 77d and 80d, the inner ends of which extend into the shaft grooves.

Means are provided for effecting simultaneous adjustment of the shafts 77 and 80 for the purpose of causing or enabling simultaneous relative axial adjustment of the pulley sections 40 and 60.

As previously indicated, such means includes the operator knob 5 which has a drive connection with the adjuster shaft 80, means being provided for interconnecting the shaft 80 with the adjuster shaft 77 to either positively effect rotation of the respective shafts in opposite direction or freeing shaft 77 for rotation in the direction opposite to the direction of positive rotation of the shaft 80, whereby axial adjustment of the pulley sections 40 and 60 is accomplished.

Figure 15:
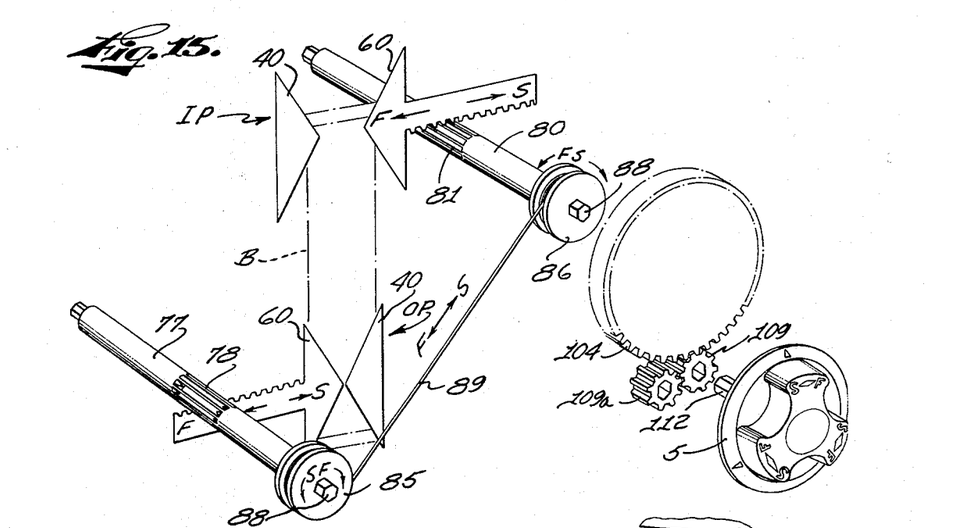
FIG. 15 is a diagrammatic view in perspective illustrating the pulley adjuster mechanism.

Referring to FIGS. 6, 7 and 15, it will be noted that the shaft 77 is provided at one end with a sheave 85 and at the corresponding end of the shaft 80 the latter is provided with a sheave 86. In order to effect a drive connection between the sheaves 85 and 86 and the shafts 77 and 80, respectively, such shafts are provided at their ends with a hexagonal recess 87 which receives an end of a hexagonal stem 88, the sheaves 85 and 86 having corresponding hexagonal openings to enable their being positioned upon the stem 88.

A cable 89 is wound a suitable number of turns about sheave 85 in one direction and is secured by suitable means to the sheave 85. At its other end the cable 89 is wrapped a suitable number of turns in the opposite direction about the sheave 86 secured thereto. Thus, clockwise rotation of sheave 86 will effect corresponding counterclockwise rotation of the sheave 86. With particular reference to FIG. 15, it will be seen that clockwise rotation of sheave 86 as just noted, will cause movement of the adjustable pulley 60 of the input pulley assembly IP away from the axially stationary pulley 40, and correspondingly, the axially adjustable pulley 60 of the output pulley assembly OP will be moved toward the axially fixed pulley 40.

Interposed between the respective pulley sections is the drive belt B and it will now be apparent that the above noted relative axial adjustment of the pulley sections 60 of the input pulley assembly and the output pulley assembly relative to the cooperative axially fixed pulleys 40 will effectively cause engagement of the belt B with different effective pulley diameters spaced radially of the diverging pulley surfaces. In other words, if the adjustable pulley section 60 be adjusted toward its cooperative pulley 40 the effective belt engaging diameter of this pulley will be enlarged; and correspondingly, if the output pulley section 60 be similarly adjusted away from its cooperative pulley 40, then the effective pulley engaging diameter of this pulley assembly will be reduced, and the effective input to output ratio of the pulley belt drive is reduced. Conversely, adjustment of the respective pulley sections 60 in the opposite direction will produce a higher input to output ratio.

As regards the just mentioned increase in the drive ratio between the input and output assemblies in the embodiment presently being described, the cable 89 does not effect positive counterclockwise rotation of the adjuster shaft 77 as a function of rotation of the adjuster shaft 80, but instead, the cable is simply slacked off so as to allow the output pulley section 60 to move toward the axially fixed pulley section 40. Hence, the distinction between the input and output pulley assemblies is that the output pulley assembly is preferably provided at 90 with a coiled compression spring which engages at one end with the marginal portion of flange 64 of the bearing support 63 on pulley shaft 51 and at its other end with the conical flange 71 of the clutch sleeve 70, thereby loading the clutch sleeve and flange into engagement with the pulley section 60 and consequently urging the pulley section 60 toward its cooperative pulley section 40 in the output pulley assembly. This spring 90 accordingly provides a spring biasing force for urging the output pulley constantly relatively one toward the other independently of load or lack of load on the output shaft.

Of course, the output pulley sections are adjusted relatively axially responsive to torque load on the output shaft OS by the previously described self-energized means including cam lobes 68 and 69 and therefore, the spring 90 need not be a heavy or strong spring such as has been heretofore employed in spring loaded adjustable pulleys, since the spring is not relied upon to maintain engagement of the belt under different load conditions, but only for assuring initial starting grip of the belt.

Figure 16:
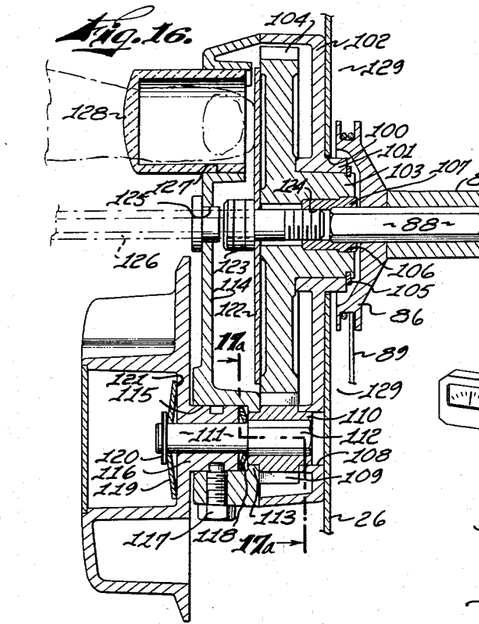
FIG. 16 is a view in horizontal section through the adjuster operating means as taken on line 16—16 of FIG. 6.

Means are provided for driving adjuster shaft 80 responsive to rotation of operator knob 5 and such means preferably comprises the novel operator mechanism as best seen in FIGS. 15 and 16. With reference to the latter figure, it will be noted that the closure plate 26 which overlies the access opening in one side of the machine is provided with an opening 100 in which a cylindical supporting bushing 101 formed as a part of a housing base 102 is disposed. Rotatively journalled in the bushing 101 is a hub 103 of large adjuster gear 104, a snap ring 105 engaging in the hub and with an end of the bushing securing the gear against axial displacement.

Suitably installed in an axial bore 106 in the gear hub 103 is a drive element 107 having in one end an extremity of the hexagonal drive element 88 previously referred, whereby rotation of the gear 104 will be transmitted to the adjuster shaft 80. Laterally spaced from the bushing 101, the housing base 102 is provided with a further integral bushing 108 in which seats one end of the hub 110 of a pinion 109. This pinion 109 is in mesh with the gear 104 and is adapted to be driven by a shaft 111 having a hexagonal drive portion 112 fitting in a corresponding opening in the hub 110. Pinion 109 is retained in the bushing 108 by means of a flange 113 formed on a section of an outer adjuster housing section 114, this housing section having a bore 115 in which a hollow stem 116 on the knob 5 is rotatably disposed, the latter being retained in the opening by means of a retainer screw 117.

The pinion shaft 111 rotatably extends through the hollow knob stem 116 and a friction clutch drive means is provided for effecting rotation of the pinion with the knob 5. Such friction clutch drive means may preferably comprise a Belleville washer 118 abutting at its inner periphery with the pinion and at its outer periphery with the inner extremity of the knob stem 116, and an opposing Belleville washer 119 engaging at its inner periphery with a retainer ring 120 on the outer extremity of pinion shaft 111 and at its outer periphery with a wall 121 provided on the knob 5. By virtue of this friction drive connection, the entire adjuster drive mechanism cannot be forced by rotation of the knob 5 to crown the pulleys against the belt and possibly cause damage to the adjuster mechanism.

Means are also provided for visually indicating the selected position of shaft 80 and consequently the selected input to output ratio. Such means comprises a graduated dial 122 in the form of a plate or disc adjustably mounted upon the large adjuster gear 104 and adapted to be retained in selected positions of orientation relative to the gear 104 by means of a cap screw 123 which engages the dial 122 and has a threaded stem engaged in threaded recess 124 in the outer end of the drive element 107. Access to the cap screw 123 is afforded through an opening 125 in the adjuster housing cover 114, the opening being adapted to receive the working end of a tool 126 shown in broken lines with which the cap screw 123 may be loosened to enable manual orientation of the dial 122 relative to the gear 104. In this connection the housing cover 114 has an opening 127 located adjacent the outer periphery of the dial 122 through which an operator's finger, as shown in broken lines, may be inserted to engage and cause rotation of the dial 122 relative to the gear 104. In order to assist in the visual observation of the selected position of gear 104 as indicated by the dial 122, a magnifying sight member 128 may be removably fitted in the opening 127, thereby rendering more clearly visible the indicia or graduations upon the dial 122.

The adjuster housing base and cover 102 and 114, as shown in FIG. 17, are secured together by means of a suitable number of fasteners 129 and as seen in FIG. 6 at least a pair of such fasteners 129 extend also through the closure plate 26 to fix the case upon the plate 26.

In accordance with one of the objectives of the invention, the adjuster mechanism just described is very flexible and may be mounted either as shown in the several views of the drawings on an end of the adjuster shaft 80 at one side of the machine, or, if preferred, the adjuster mechanism contained within the housing 102, 114 may also be installed in driving engagement with the opposite end of the shaft 80 or, if preferred, with an end of the shaft 77, thereby substantially facilitating adaptation of the assembly to various installations.

As seen in FIGS. 15, 17 and 17a, in order to enable clockwise rotation of the adjuster knob 5 to effect corresponding clockwise rotation of the shaft with which it is drivingly engaged, as for example if the knob and pinion-gear assembly is mounted at the opposite end of shaft 80 from that shown in the drawings, the housing base 102 is provided with bushing means 108a for supporting a second pinion 109a in mesh with the pinion 109 and engageable by the drive portion 112 of pinion shaft 111, whereby the pinion 109 becomes an idler which will cause the large gear 104 to rotate clockwise upon clockwise rotation of the knob 5 shown in broken lines. The housing section 113 also has a bore 115a in alignment with the bushing 108a whereby the knob stem 116 may be disposed selectively in either of the bores 115 or 115a depending upon which of the pinions 109, 109a is to be employed.

In the operation of the device as thus far described, it will now be apparent that rotation will be imparted to the input pulley assembly IP from the motor M and from this pulley assembly to the output pulley assembly and thence either to output shaft 44 or output shaft 56, as the case may be. The ratio of input to output speeds is a function of the diameter of the input pulley and the output pulley at the point of contact with the belt. During operation of the drive mechanism at any selected ratio, the requirement for friction between the belt and the respective pulley sections depends substantially upon the load requirements. The self-energizing camming means comprising cam lobes 68 and 69 embodied in both of the pulley assemblies assures that any tendency of the belt to slip relative to the pulley 40 will result in the application of a greater axial compressive force on the belt, inasmuch as any such slippage will cause relative rotation between one or the other of the pulley sections 40 and the opposing pulley section 60 with consequent relative rotation between the clutch sleeve 70 which carries the cam lobes 69 and the thrust bearing support 63 which carries the cam lobes 68, the latter being rotatable with the shaft 51 while the former is rotatable with the pulley section 60. The friction facing material 72 will transmit torque as between the pulley section 60 and the clutch sleeve 70 but allows sufficient slippage to absorb instantaneous shock loads so that the latter are not applied to the camming lobes.

In the event that the operator desires to modify the input to output ratio by raising the ratio with the result that the output shaft will run faster, he need simply rotate the knob 5 in a clockwise direction, as denoted by the indicia F appearing on the knob, and through the gear 109, the gear 104 will drive the adjuster shaft 80 and its sheave 86 in a counterclockwise direction and the pinion 81 on shaft 80 will move the rack 82 and consequently pulley section 60 of the input assembly axially toward the relatively stationary pulley section 40, thereby causing the belt B to be moved outwardly between the divergent pulley sections so as to contact the latter at a larger effective pulley diameter. Concurrently, cable 89 is provided with slack which will permit the adjuster shaft 77 to rotate in a clockwise direction causing pinion 78 to move rack 79 and hence pulley section 60 of the output pulley assembly away from the pulley section 40, whereby the belt may contact the divergent pulley sections at a smaller effective diameter.

It will be understood in this connection that in this embodiment the belts being pulled against the divergent output pulley sections by the positive action of the output pulley sections tending to shift the belt outwardly therebetween, will overcome the effect of spring 90 on the output pulley section 60, but the spring will nevertheless maintain driving frictional engagement during the period of ratio change.

On the other hand, if it be desired to lower the input to output ratio so that the output shaft will run comparatively slower, then the knob 5 is rotated in a counterclockwise direction, resulting in clockwise rotation of the adjuster shaft 80 and movement of the input pulley section 60 away from the relatively stationary pulley 40. Simultaneously, the cable 89 will cause counterclockwise rotation of the adjuster shaft 77 resulting in movement of the output pulley section 60 toward the relatively stationary pulley section 40.

In FIG. 19 there is illustrated a modified pulley assembly wherein reference characters are employed which are similar to those hereinafter referred to with the exception that the hub of the adjustable pulley section 60 is designated 61a, and it will be noted that in this modified construction the clutch sleeve 70 has been eliminated and the cam lobes designated 69a are formed on the end of the pulley hub 61a. This is to say that the distinction between the embodiment of FIG. 19 and the first described structure as shown in FIG. 7 is that the embodiment of FIG. 19 has no friction clutch interposed between the self-energized cam lobes and the adjustable pulley section. Otherwise, the assemblies are the same.

In addition, various modifications of drive means comprising sheaves 85 and 86 and cable 89 may be resorted to, including those shown generally in FIGS. 20–23.

Figures 20, 21, 22, 23:
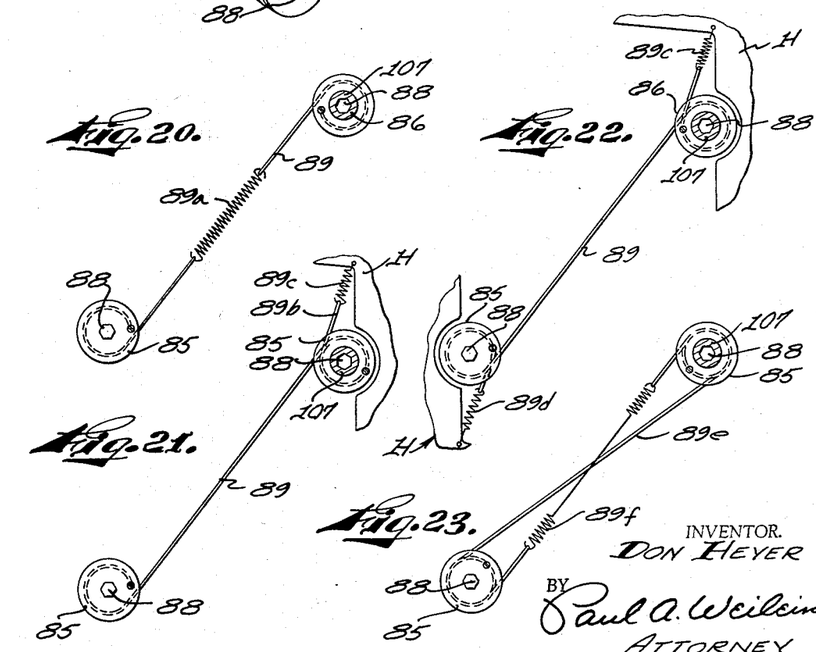
FIG. 20 is a schematic detail view illustrating a modified adjuster shaft connecting means.
FIG. 21 is a view similar to FIG. 20 showing a further modified adjuster shaft connecting means.
FIG. 22 is a view similar to FIG. 20 showing still another modified form of adjuster shaft connecting means.
FIG. 23 is also a view similar to FIG. 20 showing yet another modified form of adjuster shaft connecting means.

Referring to FIG. 20, there is interposed in the cable 89 a coiled tension spring 89a. Otherwise, the modification will be identical to the originally described construction. It will be observed that the effect of the spring 89a is to constantly provide a spring force tending to rotate the sheave 85 in a counterclockwise direction and to rotate the sheave 86 likewise in a counterclockwise direction. Therefore, in each case the spring force tends to urge the adjustable pulley section 60 of the respective pulley assemblies toward the opposed relatively stationary pulley section 40, whereby to compensate for backlash in the gear and cam system.

In the modification of FIG. 21, the cable 89 has an end 89b which is connected by means of a spring 89c to a portion of the housing, the cable being wrapped a number of turns about the sheave 86, but not secured thereto as in the two embodiments described above.

In FIG. 22, a modification is shown wherein in addition to the spring 89c as in FIG. 21, there is also at the other end of the cable 89 adjacent the sheave 85 a spring 89d connected to the end of the cable and to the housing H.

In the embodiment of FIG. 23, the cable is designated 89e and is reversely wrapped about the sheaves 85 and 86 so as to effect a positive drive of the sheave 85 in both directions, whereas in the embodiments heretofore described, the sheave 85 is only positively driven in one direction. Installed in the reversely wrapped cable 89e is a coiled tension spring 89f to maintain tension on the cable.

Figures 12, 18:
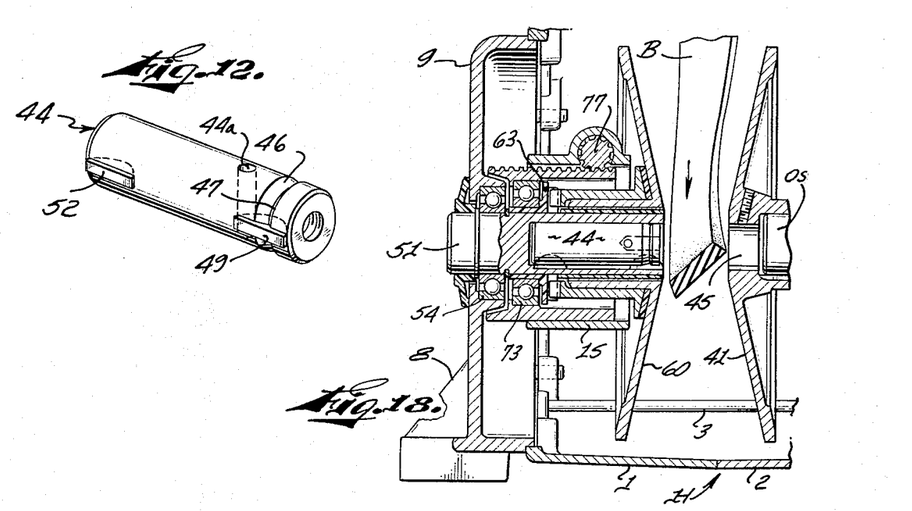
FIG. 12 is a detailed view in perspective illustrating a portion of the telescopic pulley shaft.
FIG. 18 is a fragmentary view in section illustrating the manner of installing a new belt between the pulley sections.

According to one of the features of the invention, installation of a belt B has been substantially facilitated in the construction of the pulley assemblies, as is more particularly illustrated in FIG. 18. As previously described, the central shaft 44 of the pulley assemblies at one end is releasably connected with the pulley hub 41 by means of the set screws 48 engageable with the abutment face 47. Upon reference to FIG. 18, it will be apparent that the set screws 48 may be released to free the end of shaft 44 so that the latter may be moved axially relative to the hollow end 50 of the outer shaft 51. To facilitate such movement of the central shaft 44, it is provided with an opening 44a engageable by a pin or the like for retracting the shaft end from the hub 41. With the shaft 44 moved axially so as to be housed within the shaft 51, a space is provided between the pulley sections 40 and 60 whereby a belt B may be passed therebetween. In prior pulley assemblies which have been spring loaded to engage the belt, splitting of the pulley assembly has not been practical due to the large spring force tending to bias the pulley sections together, and therefore, it has been generally required that the assemblage be disassembled for the purpose of belt change. In view of the present invention, such belt change may be effected simply by removal of the closure plate 25 at one side of the housing to gain access to the pulley assemblies for disconnection of the shaft 44.

Figure 24:
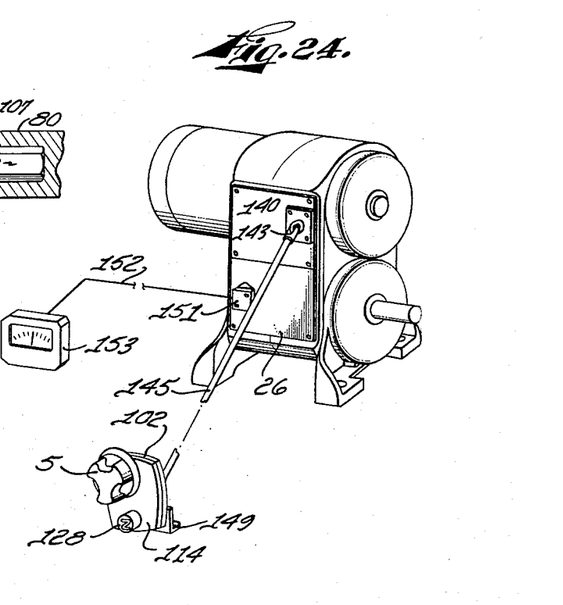
FIG. 24 is a view in perspective illustrating a modified operating means for the adjuster mechanism of the device, and illustrating electrically operated ratio indicator.
Figure 25:
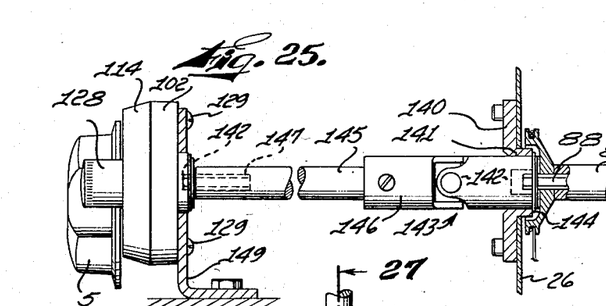
FIG. 25 is a fragmentary view partly in elevation and partly in section illustrating certain of the details of the modified operating means of FIG. 24.

In accordance with another feature of the invention, the adjuster shaft 80, or as described above, the adjuster shaft 77, may be remotely operated. Accordingly, as shown in FIGS. 24 and 25, an adapter plate 140 is mounted on the closure plate 26, this adapter 140 having a bearing hub 141 through which extends a member 142 of a universal joint 143, the member 142 being retained in the bearing hub by a snap ring 144 and having a hexagonal recess for drive connection to the hexagonal drive element 88 of shaft 80. An operating link 145 connected to the element 146 of the universal joint may extend to any desired remote location and is preferably adapted by means of a hexagonal recess 147 to be driven by a hexagonal drive element 142 which is in turn driven by the operator mechanism heretofore described, the latter being in FIGS. 24 and 25 shown as supported on a remote bracket 149.

In addition, it may be desired to indicate at a remote location the setting of the input to output ratio. Accordingly, in FIGS. 1, 6, and 25 there is illustrated the attachment of a potentiometer 150 to the adjuster shaft 77, this potentiometer being enclosed in a housing 151 fastened to the closure plate 126. A conductor 152 connects the potentiometer to a voltmeter 153 which may be calibrated in terms of selected ratios.

Figure 26:
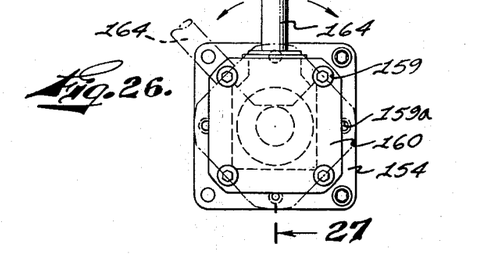
FIG. 26 is a fragmentary view in elevation illustrating a modification of the adjuster operating means.
Figure 27:
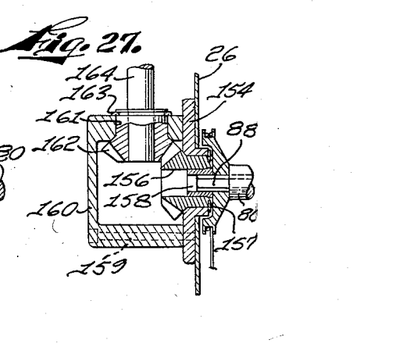
FIG. 27 is a sectional view as taken on the line 27—27 of FIG. 26.

Referring to FIGS. 26 and 27, still another drive mechanism is illustrated for the purpose of effecting adjustment of the adjuster shaft 80 or, alternatively, the adjuster shaft 77. In this modification an adapter plate 154 is connected to the closure plate 26 and has a bearing hub 155 which supports a bevelled gear 156, the latter being retained in hub 155 by a snap ring 157. A drive connection between the hexagonal element 88 of adjuster shaft 80 and the gear 156 is effected by the insert 158 disposed in a central opening in the gear 156. Connected to the adapter plate 154 by means of suitable fastenings 159 is a gear case 160 having an opening 161 in a side thereof disposed at a right angle to the axis of gear 156. Within this opening is journalled a bevelled gear 162 in mesh with the gear 156 and retained in place by a snap ring 163. Gear 162 is connected with a drive shaft 164 for transmitting rotation to the shaft 80. As best seen in FIG. 26, the adjuster plate 154 has a plurality of angularly spaced openings 159a for reception of the fasteners 159 so that the case 160 may be mounted on the plate 154 in any selected one of a number of various possible angular positions. In the illustrative embodiment the case may be so oriented relative to the plate that the axis of the shaft 164 may be moved angularly in increments of 45° to the selected location.

Various other changes and alterations may be resorted to without departing from the spirit of the invention as defined in the appended claims.

I claim:

1. A variable pulley-belt drive comprising: a support structure, an input shaft and an output shaft carried by said support structure in laterally spaced relation, input and output pulley assemblies operatively connected with said respective shafts and each including a pair of pulley sections having divergent surfaces, means mounting said pulley sections for movement of one pulley section of each assembly toward and away from the other pulley section of its pair, and means for moving said one pulley sections of both of said assemblies including a pair of adjuster shafts, means connecting said adjuster shafts respectively to one of said movable pulley sections to move the latter upon rotation of said adjuster shafts, means for rotating said pair of adjuster shafts simultaneously in at least one direction, a belt engaged between the divergent surfaces of said pulley sections at relative effective pulley diameters governed by rotation of said adjuster shafts, said means for rotating said adjuster shafts simultaneously comprising a part on said adjuster shafts and rotatable therewith, and a cable oppositely wrapped about and extending between said rotatable parts.

2. A variable drive as defined in claim 1, wherein a spring is connected with said cable.

3. A variable pulley-belt drive comprising: a support structure, an input shaft and an output shaft carried by said support structure in laterally spaced relation, input and output pulley assemblies operatively connected with said respective shafts and each including a pair of pulley sections having divergent surfaces, means mounting said pulley sections for movement of one pulley section of each assembly toward and away from the other pulley section of its pair, and means for moving said one pulley section of both of said assemblies including a pair of adjuster shafts, means connecting said adjuster shafts respectively to one of said movable pulley sections to move the latter upon rotation of said adjuster shafts, means for rotating said pair of adjuster shafts simultaneously in at least one direction, a belt engaged between the divergent surfaces of said pulley sections at relative effective pulley diameters governed by rotation of said adjuster shafts, said means for rotating said adjuster shafts including an operator member, and means connecting said operator to one of said adjuster shafts including slip clutch means.

4. A variable pulley-belt drive comprising: a support structure, an input shaft and an output shaft carried by said support structure in laterally spaced relation, input and output pulley assemblies operatively connected with said respective shafts and each including a pair of pulley sections having divergent surfaces, means mounting said pulley sections for movement of one pulley section of each assembly toward and away from the other pulley section of its pair, and means for moving said one pulley section of both of said assemblies including a pair of adjuster shafts, means connecting said adjuster shafts respectively to one of said movable pulley sections to move the latter upon rotation of said adjuster shafts, means for rotating said pair of adjuster shafts simultaneously in at least one direction, a belt engaged between the divergent surfaces of said pulley sections at relative effective pulley diameters governed by rotation of said adjuster shafts, said means for rotating said adjuster shafts including an operator member, means at the opposite ends of each of said adjuster shafts and said operator member selectively interengageable with one another.

5. A variable pulley-belt drive comprising: a support structure, an input shaft and an output shaft carried by said support structure in laterally spaced relation, input and output pulley assemblies operatively connected with said respective shafts and each including a pair of pulley sections having divergent surfaces, means mounting said pulley sections for movement of one pulley section of each assembly toward and away from the other pulley section of its pair, and means for moving said one pulley section of both of said assemblies including a pair of adjuster shafts, means connecting said adjuster shafts respectively to one of said movable pulley sections to move the latter upon rotation of said adjuster shafts, means for rotating said pair of adjuster shafts simultaneously in at least one direction, a belt engaged between the divergent surfaces of said pulley sections at relative effective pulley diameters governed by rotation of said adjuster shafts, said means for rotating said adjuster shafts including an operator member, means at the opposite ends of each of said adjuster shafts and said operator member selectively interengageable with one another, selectively interengageable drive means operable by said operator member for allowing rotation of said operator member in the same direction to effect similar rotation of said adjuster shafts upon connection of said operator member with either end of said adjuster shafts.

6. A variable pulley-belt drive, comprising: a support, an input shaft and an output shaft mounted on said support in laterally spaced relation, input and output pulley means on the respective shafts, each pulley means including opposed pulley sections movable axially one relative to the other and having opposed divergent surfaces engageable by a belt, means for moving said one pulley section axially, at least one of said pulley means including means supporting one pulley section for rotation relative to the other pulley section, said means for moving said one pulley section axially including self-energized means responsive to relative rotation of said pulley section, and a belt extending about and engaged with the divergent pulley surfaces.

7. A variable pulley-belt drive as defined in claim 6, wherein said means supporting said one pulley section for rotation relative to the other pulley section comprises a self-lubricating bushing mounting said one pulley section on its shaft.

8. A variable pulley-belt drive, comprising: a support, an input shaft and an output shaft mounted on said support in laterally spaced relation, input and output pulley means in the respective shafts, each pulley means including opposed pulley sections movable axially one relative to the other and having opposed divergent surfaces engageable by a belt, means for effecting axial movement of said movable pulley section, at least one of said pulley means including means supporting one pulley section for rotation relative to the other pulley section, cam means rotatable with the shaft and cooperative cam means carried by said one relatively rotatable pulley section, and a belt disposed about and engaged with the divergent pulley surfaces.

9. A variable pulley-belt drive as defined in claim 8, wherein said cam means carried by said one pulley section includes a member rotatable relative to said one pulley section and including friction clutch means for drivingly connecting said member said one pulley section.

10. A variable pulley-belt drive as defined in claim 8, wherein said cam means carried by said one pulley section includes a portion integral with said pulley section.

11. A variable pulley-belt drive, comprising: a support, an input shaft and an output shaft mounted on said support in laterally spaced relation, input and output pulley means on the respective shafts, each pulley means including opposed pulley sections movable axially one relative to the other and having opposed divergent surfaces engageable by a belt, means for effecting axial movement of said movable pulley section, each of said pulley assemblies including means mounting one of its pulley sections for rotation relative to the other pulley section, self-energized means responsive to rotation of said one pulley relative to the other pulley section for moving said one pulley toward the other pulley section, and a belt disposed about and engaged with the divergent pulley section surfaces.

12. A variable pulley-belt drive as defined in claim 11, wherein said means for effecting axial movement of said movable pulley sections comprises gear means engageable with the respective shiftable pulley sections; and means for operating said gear means including a pair of adjuster shafts respectively engageable with the gear means of the pulley assemblies; and means interconnecting said adjuster shafts for simultaneous operation.

13. A variable pulley-belt drive as defined in claim 11, wherein said means for effecting axial movement of said movable pulley sections comprises gear means engageable with the respective shiftable pulley sections; means for operating said gear means including a pair of adjuster shafts respectively engageable with the gear means of the pulley assemblies; and cable and sheave means interconnecting said adjuster shafts together for operation simultaneously in opposite directions, said gear means including means for moving one of said movable pulley sections in one direction and the other of said pulley sections in the other direction responsive to rotation of said adjuster shafts in opposite directions.

14. An adjustable pulley assembly comprising: a pulley shaft, an axially fixed pulley section on said shaft, a relatively axially adjustable pulley section, means supporting said adjustable pulley section on said shaft for relative rotation therebetween, and self-energized means on said shaft and said means supporting said adjustable pulley section on said shaft for urging said adjustable pulley section toward said axially fixed pulley section responsive to relative rotation in either direction between said adjustable pulley section and said shaft, said self-energized means including a member keyed to said shaft and a member carried by said adjustable pulley, coengageable cam means on said members, and means engaged with said member on said shaft for adjusting the relative axial disposition of said adjustable pulley and said members relative to said shaft.

15. An adjustable pulley assembly, comprising: a pulley shaft, an axially fixed pulley section on said shaft, an axially adjustable pulley section including a hub extending longitudinally of said shaft, a cutch leeve slidably and rotatably disposed upon said hub, friction clutch means coengageable between said clutch sleeve and said adjustable pulley section, a member keyed to said shaft for rotation therewith, and self-energized means interposed between said member and said clutch sleeve for forcing said clutch sleeve into engagement with said adjustable pulley section responsive to relative rotation between said hub and said shaft.

16. An adjustable pulley assembly as defined in claim 15, including a self-lubricating bearing sleeve interposed between said shaft and said hub of said adjustable pulley section.

17. An adjustable pulley assembly as defined in claim 15, wherein means are provided for shifting said member keyed to said shaft, said clutch sleeve, and said adjustable section toward said axially fixed section as a unit, said means comprising an actuator member engaged with said member keyed to said shaft, thrust bearing means interposed between said members, a rack on said actuator member, a pinion engaged with said rack, and means for driving said pinion to effect movement of said actuator member longitudinally of said shaft.

18. An adjustable pulley assembly as defined in claim 15, wherein said pulley shaft includes a hollow shaft section disposed within the hub of said adjustable pulley section, a central shaft section telescopically engaged in said hollow shaft section and including means for effecting rotation of said hollow and central shaft sections, and means releasably connecting said central shaft section to said axially fixed pulley section.

19. A variable pulley-belt drive, comprising: a two-part housing abutting medially, means securing said housing parts together, said housing having in opposing walls a pair of laterally spaced openings, a motor mounted in one of said openings, an output shaft mounted in another of said openings in laterally spaced relation to said motor, adjustable pulley assemblies interconnected with said motor so as to be driven thereby and with said output shaft so as to drive the same, means in the other housing openings cooperating with said motor and with said output shaft for supporting said pulley assemblies, said pulley assemblies respectively having an axially fixed pulley section and an axially adjustable pulley section, said pulley sections having opposed divergent surfaces, a belt disposed about and engaged with the divergent pulley surfaces, said housing having an opening in a wall thereof extending between said opposing walls of the housing, and each of said pulley assemblies including means releasably and adjustably interconnecting the respective pulley sections whereby said pulley assemblies may be separated to enable the installation of a belt through said last mentioned housing opening.

20. A variable pulley-belt drive comprising: a two-part housing, means connecting said housing parts together, each of said housing parts having in a wall thereof a pair of laterally spaced openings, a support mounted in each of said openings, a pulley shaft journalled in diagonally related supports at opposite sides of the housing, a second shaft journalled in the other diagonally related openings and connected to said pulley shafts, a pulley section fixed to each pulley shaft for rotation therewith, a second pulley section mounted on each pulley shaft for axial movement and rotation relative thereto, said pulley sections having opposed divergent faces, a belt extending about said pulley shafts and engaged with the divergent faces, means for effecting axial adjustment of said axially movable pulley sections to vary the effective belt contacting diameter of the pulley sections, and adjuster means for effecting axial adjustment comprising an adjuster shaft, said housing adjacent one of said openings in each housing part having a portion provided with a bore, said adjuster shaft being journalled in said bore, and means on said portion engageable with said adjuster shaft to retain the latter in said bore.

References Cited by the Examiner
UNITED STATES PATENTS

| 2,262,782 | 11/1942 | Strom | 74—230.17 |
| 2,905,005 | 9/1959 | Miner | 74—230.17 |
| 3,180,163 | 4/1965 | Robertson | 74—230.17 |

DAVID J. WILLIAMOWSKY, *Primary Examiner.*

L. H. GERIN, *Assistant Examiner.*